Fig.3.

Sept. 1, 1931.  J. V. MARTIN  1,821,657
AUTOMOBILE STRUCTURE
Filed Oct. 29, 1925  11 Sheets-Sheet 5

Fig.5.

INVENTOR
James V. Martin

Sept. 1, 1931.  J. V. MARTIN  1,821,657
AUTOMOBILE STRUCTURE
Filed Oct. 29, 1925  11 Sheets-Sheet 7

INVENTOR
James V. Martin

Sept. 1, 1931.  J. V. MARTIN  1,821,657
AUTOMOBILE STRUCTURE
Filed Oct. 29, 1925  11 Sheets-Sheet 9

INVENTOR
James V. Martin

Patented Sept. 1, 1931

1,821,657

UNITED STATES PATENT OFFICE

JAMES V. MARTIN, OF GARDEN CITY, NEW YORK

AUTOMOBILE STRUCTURE

Application filed October 29, 1925. Serial No. 65,596.

The primary object of my invention is to simplify and lighten automobile construction by novel combinations of well known elements, and other objects are as follows:

To provide a novel shock-absorbing mounting upon an automobile body for a drive wheel and a novel drive through the wheel and its shock-absorbing mounting.

To provide a novel combination of means for driving the drive wheels and elastically suspending the body directly upon the wheels, while maintaining each wheel in a fixed plane of rotation.

To improve the disclosures made in my Patents Nos. 1,432,771, 1,471,968 and 1,546,500.

To place the vehicle shock-absorber between the wheel and the rear end differential drive so that this latter shall hereafter become suspended weight with the shock-absorber bracket holding the wheel in the plane of rotation by direct attachment to the body of the vehicle.

To relieve the shock-absorber and the drive housing from torque due to braking.

To provide a sprung means for holding steering road wheels in different steering positions.

To provide an improved form of body which shall function in place of the conventional chassis and body by lending its side wall and internal bracing strength to maintain the drive wheel alinement.

To provide improved means of using in combination rubber both in tension and compression in a shock-absorber.

Other objects of my invention will be disclosed in the following description and accompanying drawings in which similar numerals refer to similar parts through the several views.

Fig. 15 shows the brake and shock-absorber with the wheel removed and the side of the car where the wheel shock-absorber is attached and the relative size and positions of the propeller shaft and the shock-absorber attachment, while Fig. 16 shows the slotted bracket attachment to body wall.

The body 1, functions in my invention in place of the conventional chassis and body, since a reinforcing strip or sill 2, rigid with and forming part of the base of the body, carries the motor and driving parts as well as the seats and top of the car. 1a, 1c, 1b and 1d are the parts of the drivers and passengers seats respectively. Numerals 3 and 4 in Figs. 5 and 6 designate that a preferred construction of the car walls is plywood or plymetal held in position by ribs 3. A floor 5, rigid with the body and sill is provided with a housing brace 6, rigid with the floor and side walls of the body and forming a support for the differential rear drive, while the car body 1 and the sill 2 are supported directly upon the shock-absorber mounts of the wheels, as hereinafter described.

Figure 5:
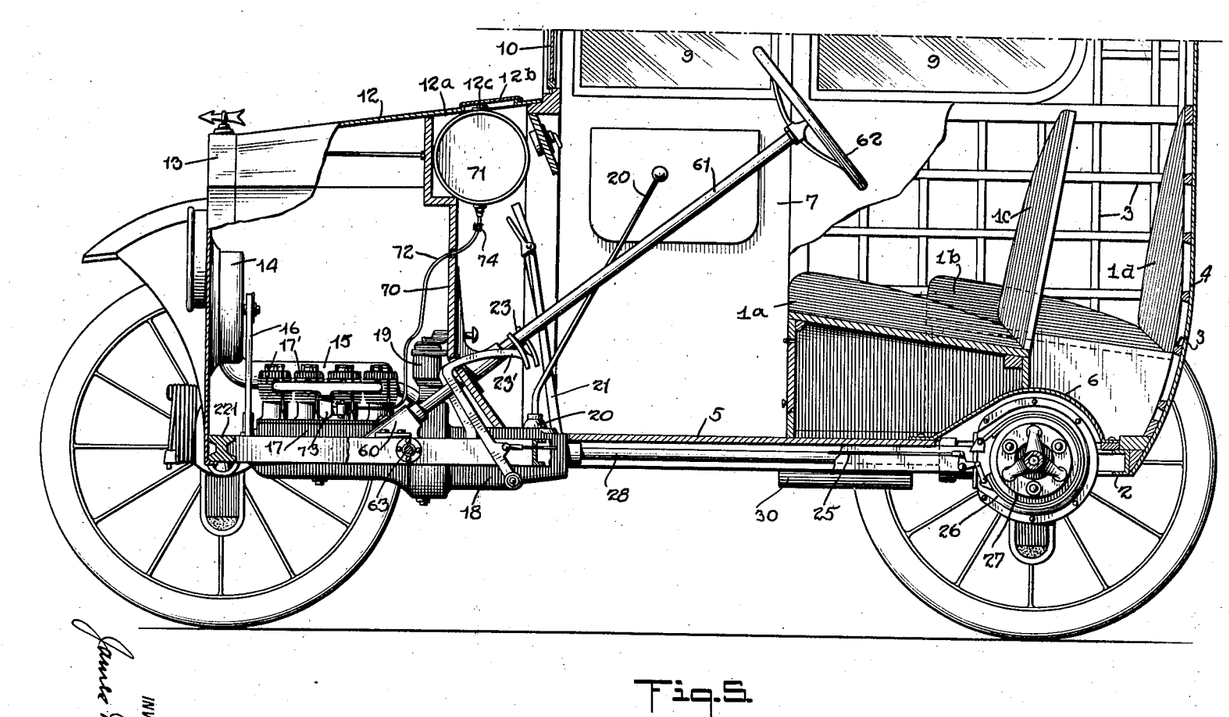
Fig. 5 is a side elevation, partly broken away to clearly reveal the interior parts of the car.
Figure 6:
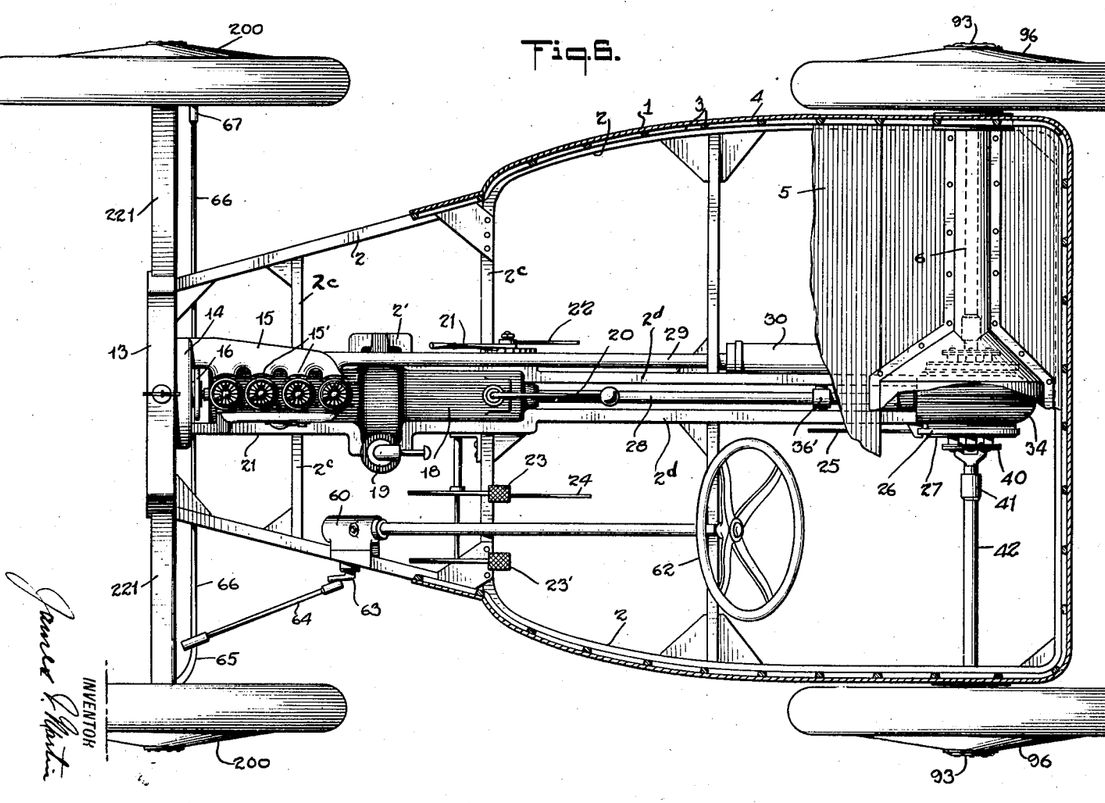
Fig. 6 is a plan view with the car top removed, showing interior parts, and with the car floor broken away so as to reveal parts of the lower body sill.
Figures 7, 17:
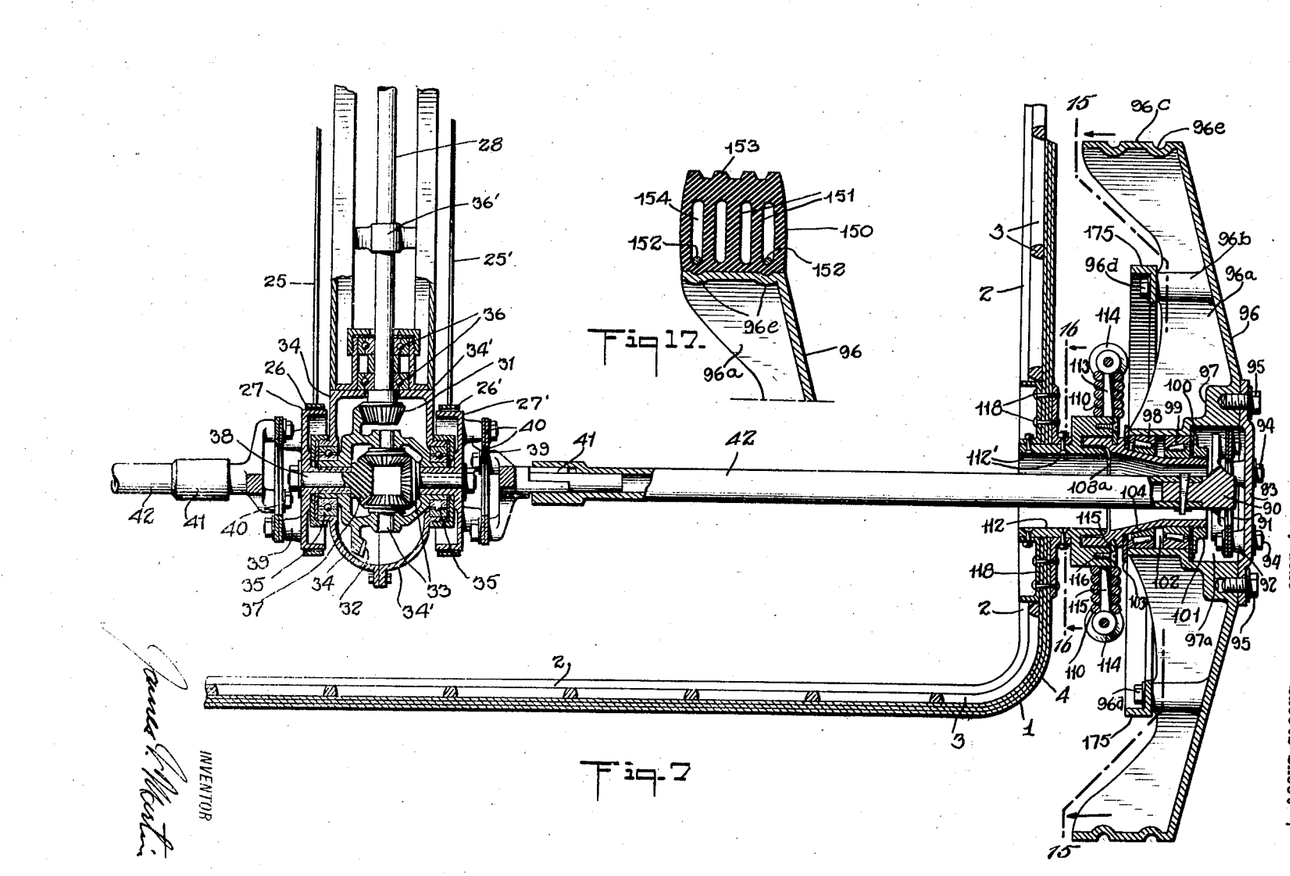
Fig. 7 is a sectional view through the car rear end drive.
Fig. 17 shows my improved tire especially adapted for the type of suspension disclosed.
Figure 8:
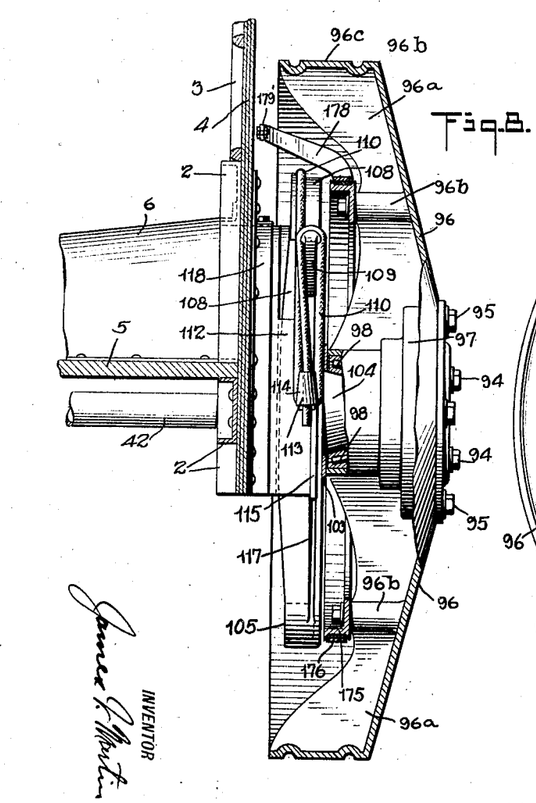
Fig. 8 discloses the important elements in the new wheel and car drive, suspension and brake.
Figure 9:
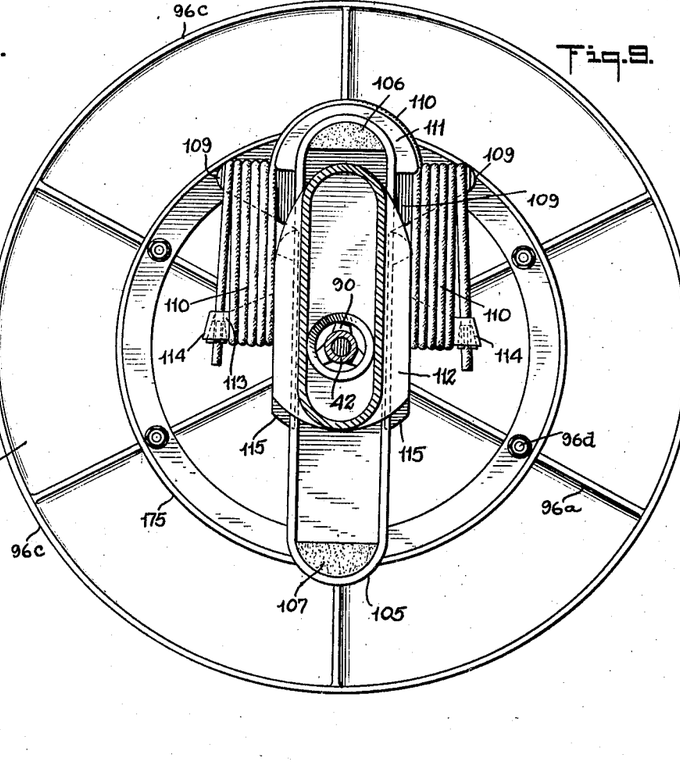
Fig. 9 is a view of the wheel shock-absorber and brake assembly looking at the wheel from the position of its body attachment.
Figure 10:
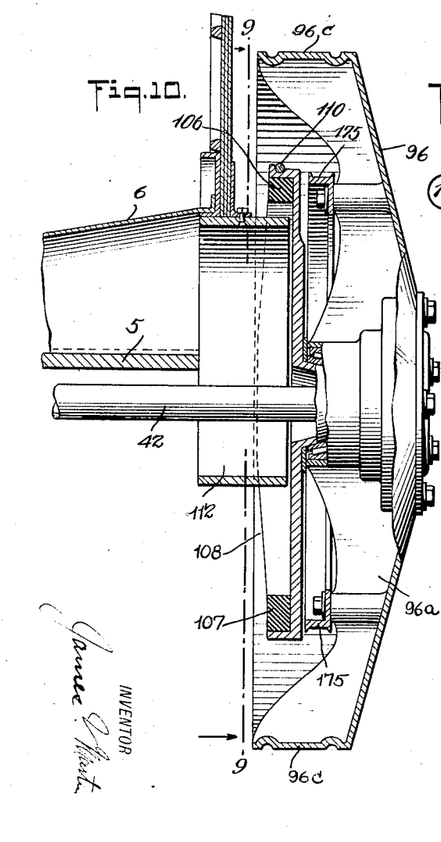
Fig. 10 shows a sectional view through the drive wheel illustrating the normal position of the shock-absorber.

By reference to the drawings, Figs. 5, 6 and 7, it will be observed that the sill 2 comprises the reinforced lower margin of the body bottom from the rearmost portion all around the body to the front where it includes member 221 and also intermediate transverse members combined securely together and with the body walls 4 and the floor 5 to form with transverse brace 6 a reinforced foundation base for the body affording great strength and protection for the driving parts. The sills 2a and the floor 5 extend from the extreme rear of the car to the front transverse bracket 221 which provides for the mounting of the front wheels and coacts with the side sills and reinforced lower portion of the body to support suitable wheel attachments without the intervention of the conventional chassis frame.

Numeral 7 indicates a door on the right hand of the car shown and numeral 9 the windows which can be moved to desirable positions. 10 indicates the front glass and 10' the rear, while 11 indicates the visor.

The hood 12, has a dummy radiator 13 in front of it and in place of the usual open portions the radiator is closed to air circulation excepting where the rotary fan 14 takes air and forces the said air through pipe manifold 15 around the flanged cylinders of the motor 17. This forced air circulation is directed equally at the hottest point of the exhaust side of the cylinders by belt drive 16 and not only cools the motor where cooling is most needed, but blows the hot air around the cylinders to the intake manifold, and carburetor 73.

Figures 15, 16:
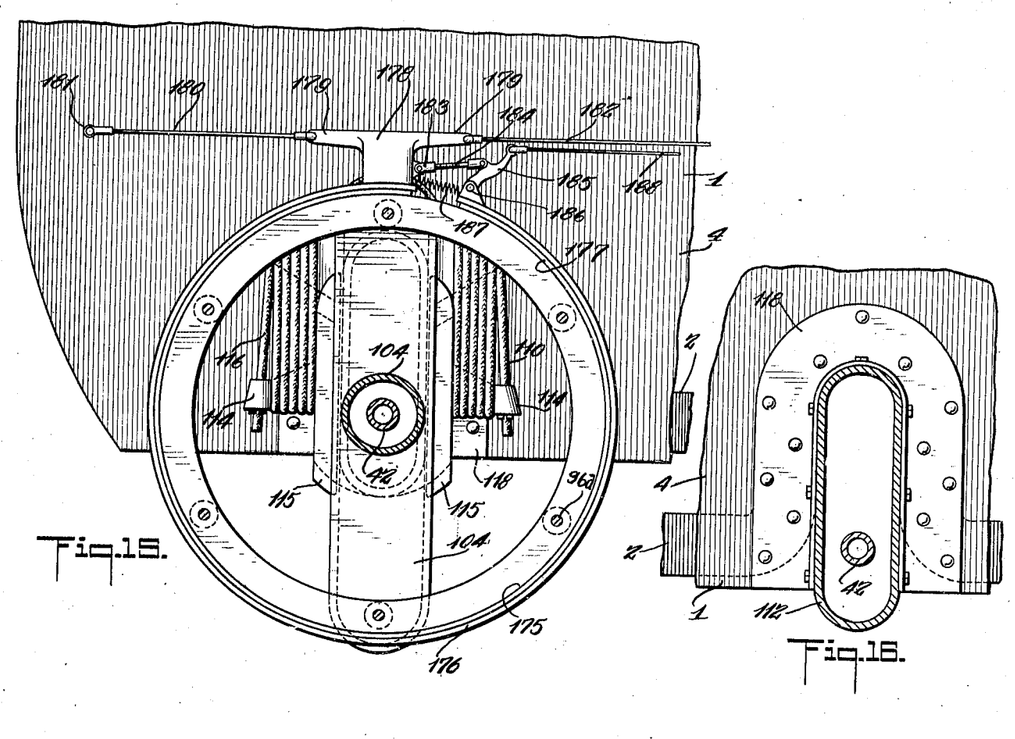

The crank and gear case housing 18 is of conventional pattern and a suitable starter 19 is arranged alongside the flywheel, all these parts being specially provided with a support 2d carried on the adjacent cross-sills 2c and which continues aft and mounted on certain of the sills 2c, to aid in the support of the differential and keep the driving parts in alinement without the use of universals. The gear shift control lever 20 is of conventional form and disposition, while the hand brake lever 21 is attached operatively to pull rod 22 which operates brake band 26' on drum 27' or through a yoke both brake bands shown in section in Fig. 7, including 26 and 27, or it can be arranged to operate, through a yoke, pull rods 188 on the brake bands 176 of the rear wheels, clearly shown in Fig. 15. 23' is a foot pedal to operate clutch in flywheel housing, while 23 is another foot pedal for the brake 24 which in turn through a yoke can operate either the wheel brakes shown in Figs. 7, 8, 9 and 15 or either one or both brakes shown adjacent the differential 26, 26'—27, 27' in Fig. 7.

28 shows the propeller shaft drive to the rear differential arranged between the bearer bars 2e and supported and guided in special bearings 36 and 36' thereon, while 29 indicates the exhaust lead from the cylinders to the muffler 30.

31 in Fig. 7 is the bevel drive at end of shaft 28 engaging with large bevel wheel 32 to which is attached the differential casing and gears 33; these operate in a housing 34 and 34' carried by transverse brace 6 which housing holds the anti-friction bearings 35, within which stub shaft 38 is driven from differential bevel 37 and this rotates the drum 27 to which are attached the lugs 39 which rotate the fabric universals 40, and these universals in turn rotate the splined shafts 41—42 which drive the wheel universals 90 through lugs 92 and plate 93.

60 indicates the housing for the steering mechanism which supports the steering column at the upper end of which is indicated the steering wheel 62, this mechanism operates the steering wheels 200 through the lever links 63—64—65 and the tie rod 66 and 67.

Figures 1, 1A:
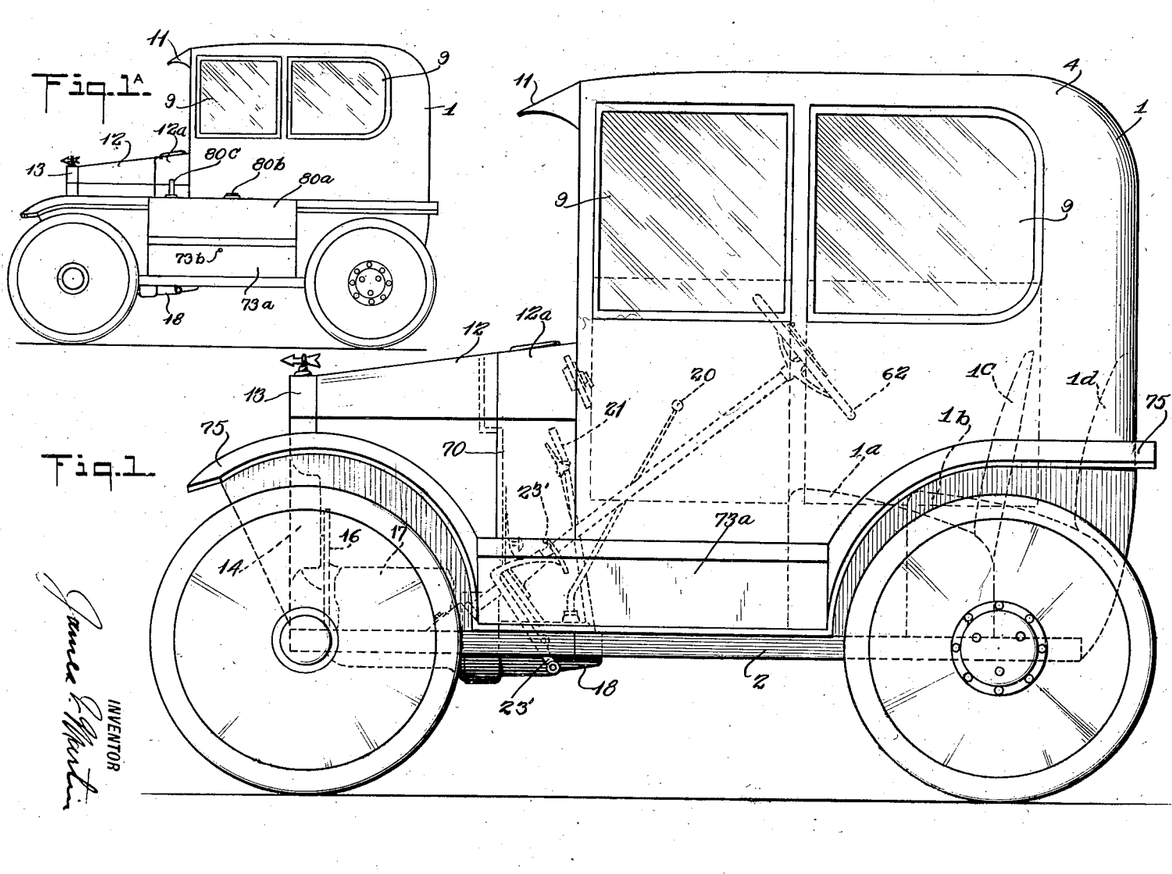
Fig. 1 is a side elevation of my invention showing important internal parts such as the motor, controls, cooling system, seats, etc. in dotted lines.
Fig. 1a is a similar view showing my improved location for the fuel tank, etc.
Figure 2:
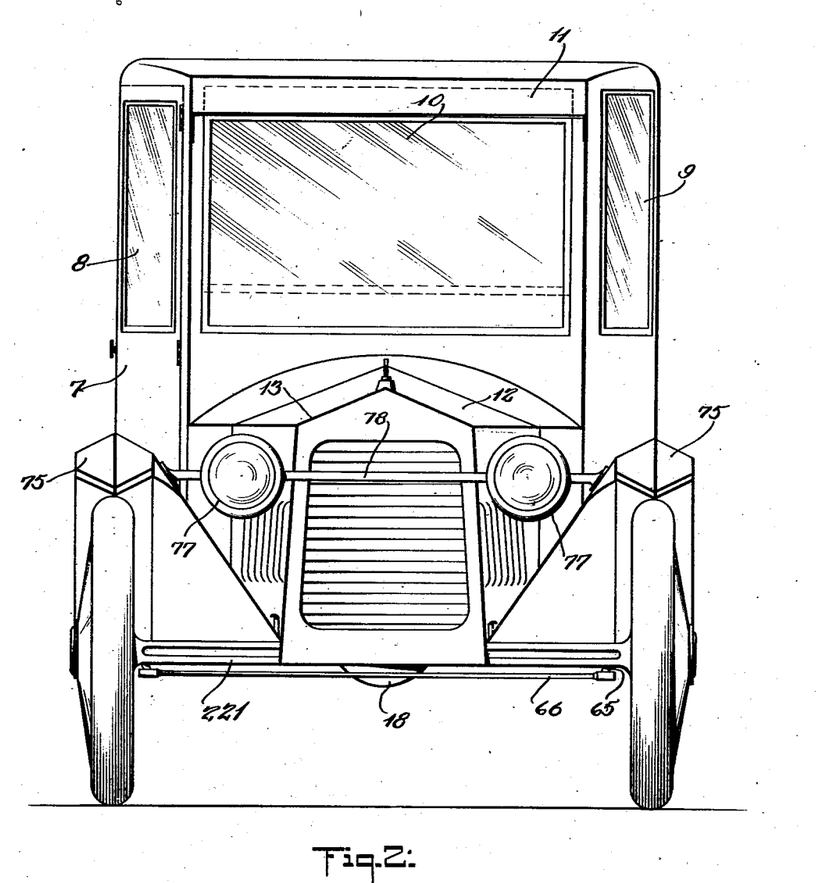
Fig. 2 is a front elevation of my novel automobile.
Figure 3:
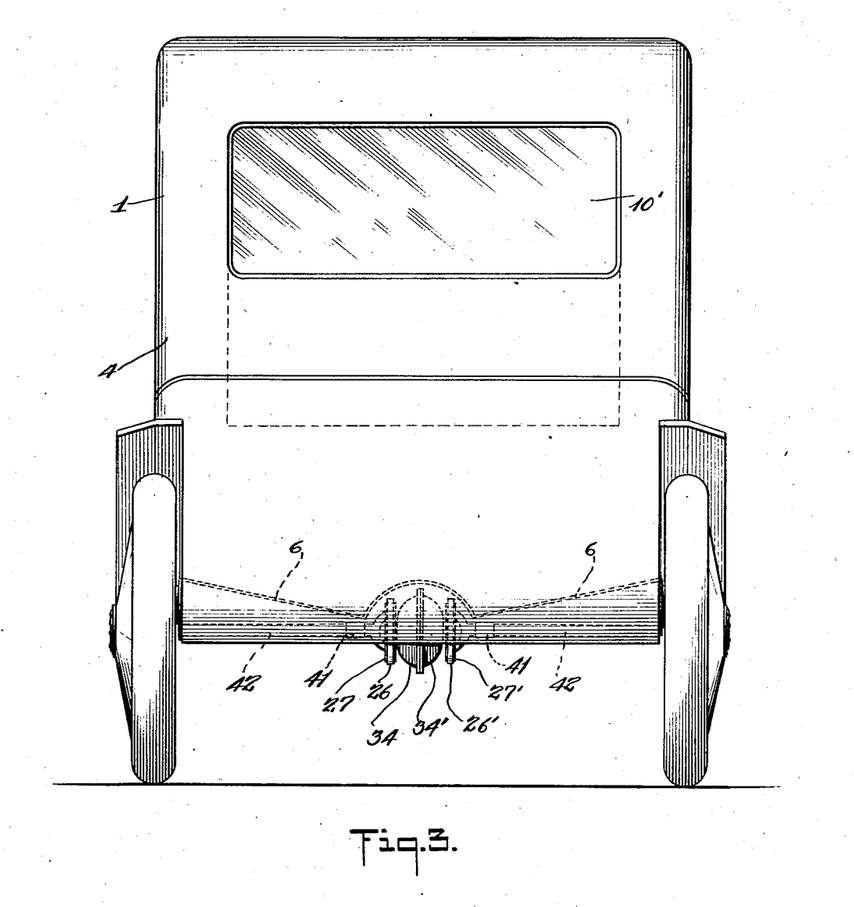
Fig. 3 is an elevation looking toward the rear of the car, and showing in dotted lines the novel rear drive arrangement.
Figure 4:
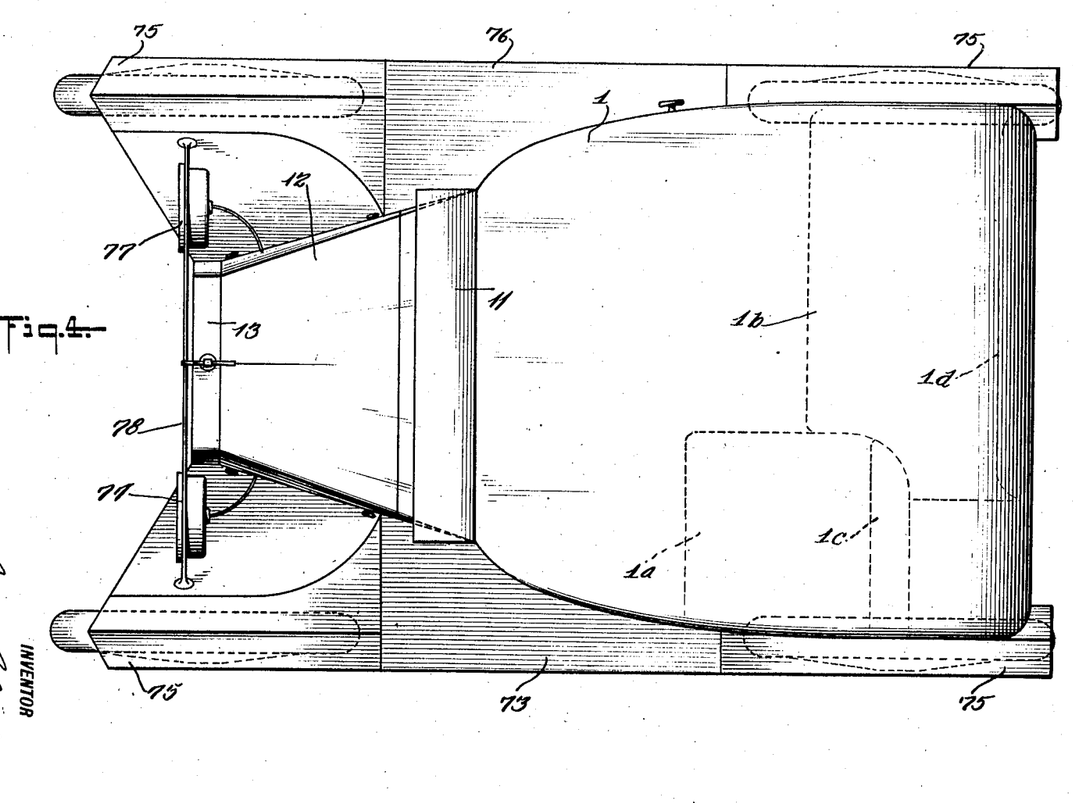
Fig. 4 is a plan view of the car showing the seating arrangement in dotted lines.

71 indicates the gas tank placed back of a fire bulk head 70, and fillable through the opening 12b and the filler cap 12c in the rear of hood 12a. 72 shows the feed pipe with valve for shut-off 74 leading to the carburetor 73, and it is intended that these members shall indicate like parts leading from the outside positioned tank 80a shown in Fig. 1a. 73a is a tool box with a lock at 73b.

75 indicates the mud guards for the auto located above the inset rear wheel housings or forming the top of said housings, 76 the running board in front of door 7, while 77 indicates the lights attached to a cross bar 78. 80b indicates the filler cap for gas tank 80a and 80c a gauge so arranged that it can be conveniently seen from the driver's seat.

96 indicates the driving wheels at the sides of the rear of the car. These wheels are driven by short drive shafts 42 through the universal 90 and the fabric disk 91, which drives the lugs 92, which turn a combined hub cap and drive plate 93 through driver attachments 94, and this plate 93 is detachably but firmly bolted at 95 to the wheel casting 96, having ribs 96a with enlarged portions to receive threaded bolts 96d holding brake drum 175 to the wheel. The rim of the wheel 96c has grooves 96e which permit the wires 152 to pinch and hold down the lower portion of tire 150 shown in Fig. 17; 151 of this figure indicates the cross sections of the vertically arranged portions of the tire which have open spaces 154 between them to permit rubber displacement for easy riding, while 153 shows an anti-skid tread on the novel form of tire; note the outwardly bulged form of the sides of tire 150.

Figure 11:
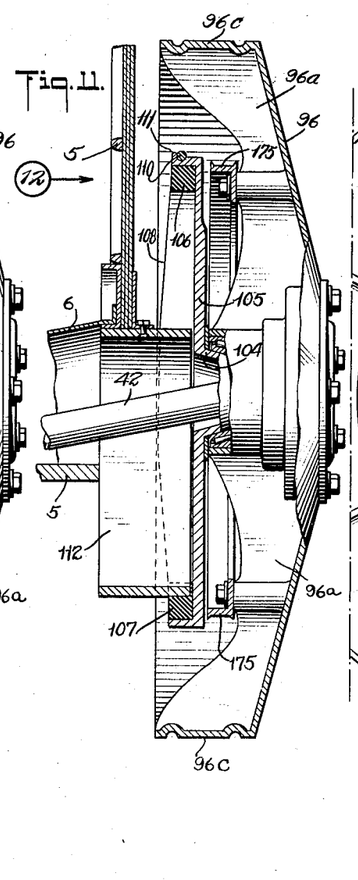
Fig. 11 shows same view as Fig. 10, but with shock-absorber extended.
Figure 12:
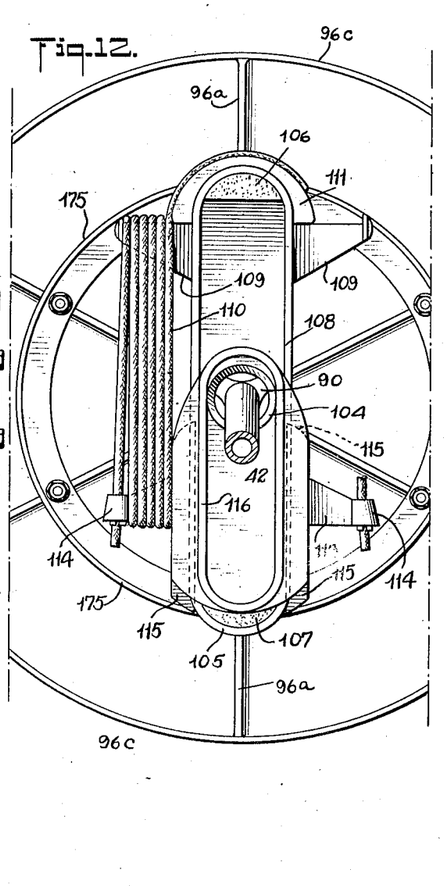
Fig. 12 is a view of the drive wheel showing shock-absorber extended to downward limit position of body.
Figures 13, 14:
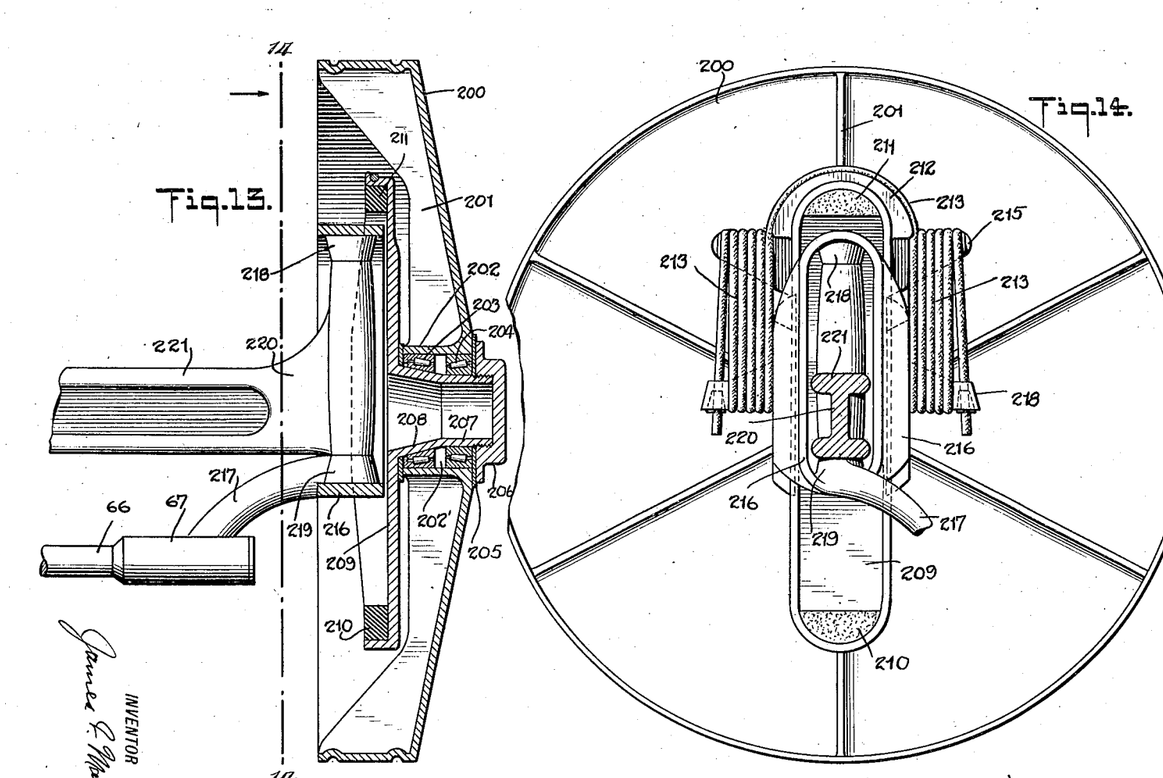
Fig. 13 shows my type of wheel including shock-absorber adapted as a steering wheel for the front of the car.
Fig. 14 is a view of the same looking at the wheel from the car side.

The wheel casting or forging is formed to provide a hub 97 having at its outer end a driving chamber 97a in which the fabric universal is located and in which it can move with shaft 42 through the angles indicated in Figs. 11 and 12. The inner part of the wheel hub is supported and guided on the anti-friction bearings 98—99 held in place on the hollow wheel spindle 104 by anti-dust rings 100 and 103. It will be noted that threaded nut 101 holds part 100 in place and also holds the wheel on the spindle 104. This spindle is integrally formed on a hollow cast wheel carrying bracket member comprising an elliptical body plate 105 having marginal side flanges 108 and top and bottom flanges forming an elliptical guideway with which the inner end of the spindle communicates and at the top and bottom of which are sponge rubber bumpers 106 and 107, which flanges 108 have milled slots 108a in which the steel plates 115 are guided for vertical movement and lubricated. The bracket 105 also has lateral arms 109, arranged above similar arms 113 on a hollow bracket member 112, about which arms of the brackets at opposite sides of the spindle, are wrapped the rubber elastic cords or bands 110, the ends of which are secured in the tapered holders 114 attached to the arms 113. The bracket member 112 is, like the bracket 105, a casting of elliptical shape and extends at its outer end into the guideway of bracket 105 and is provided in said end with guide grooves receiving the flanges 108 of bracket 105, whereby the two bracket members are slidably connected for relatively vertical movement governed by the rubber cords, the bumpers 106 and 107, and the guide plates 115, which last also hold the bracket members from endwise displacement or separation. The inner end of the bracket 112 extends through an opening in the adjacent side of the body of the car to which it is secured by bolts 112′ and 118′, the latter passing through flanged bracket plates 118, thus forming a slot or aperture for passage of drive shaft 42 outward through the side of the body and through the wheel axis for connection with the wheel. These flanged braces rigidly unite and brace parts 112 so that any distortion or shifting of these parts out of normal position will be prevented, whereby bracket 105 will always be accurately guided with relation to body to maintain the wheel always in a fixed rotation plane.

To the brake drum 175 of the drive or of the steering wheel is fitted a brake band 176 of conventional pattern with a brake lining 177, is held in normal position by arm 178 which has extensions 179 and journaled rods 180 and 182 which are respectively attached to the car body aft, as at 181 or forward by a similar fastening, so that the distance of the attachment is great enough from the wheel to allow the shock-absorber movement of same with slight play in the attachments of the rods. Obviously either the forward or rearward rod may be dispensed with if the remaining rod is made of sufficient size to take compression stress without bending. The actual operation of the brake is conventional through either the hand lever 21 or the foot pedal 23 and then by pull rod 188 to 185, one end of which is pivoted at 186 and which binds the band ends through pulling 1 and 4, the spring 187 separates the bands when the brake is released.

The front supporting and steering wheels 200 are of the general design of the drive wheel as to bearings and shock-absorber, the weight of the front part of the car being carried by the front transverse sill or bracket 221 suspended from said wheels by the associated shock-absorbers. The enlarged portion 220 is part of the steering knuckle about which arm 217 turns members 218 and 219, each rigid with bracket 216 which corresponds to bracket 112 of the driving wheel casting and moves with the body rather than with the wheels vertically, thus providing a supporting connection for the sprung tie-rod. Also bumpers 211 and 210 are similar to the drive wheel bumpers.

The bracket 209 functions much as the drive wheel bracket 105, and carries the axle spindle 208 with straight portion 207 and the anti-friction bearings 203 and 204 set in the wheel hub 202 and this hub is supported by ribs 201. The anti-dust ring 205 is held in place by the hub cap 206 and this retains the grease in the grease compartment 202′ which corresponds to compartment 102 of the drive wheel.

My invention permits direct and efficient operation and easy riding as contrasted with conventional automobile design in that my wheel mounting and shock-absorbing wheel drive eliminate the customary chassis and body as separate units and the necessity of carrying the rear drive as a pounding weight, not only unsprung so far as the springs are concerned, but subject itself to the pounding weight of the springs themselves. In operation all my driving and steering parts, save only the fabric universal in each wheel, are firmly mounted on the single unit called the body (by body I mean any container for passengers or goods) and the whole cushioned by a great movement of the rubber shock-absorbers, a movement about twice as great as that now afforded by conventional spring suspensions, and the movement is not like that of springs, ungovernable except through preventer shock-absorbers or snubbers, because my shock-absorbers are readily adjustable in tension and in stiffness by the amount of tension given to the elastic cords and by regulating the number of cords employed. Furthermore the rebound is dampened both by the cords directly and by the soft rubber bumpers. Also my construction permits of a flexible drive from the differential through the body and drive wheel supports to the wheels while, at the same time, compensating for the articulating movements of the drive shafts and preventing any displacement of the wheels from their normal rotational planes.

Previous attempts to solve the problems of automobile suspension and drive have involved the use of some sort of axle or cross-tie between the wheels. Usually such cross-ties pass under the body, requiring the body to be disposed high enough above such axles or cross-ties to leave room for the reception of the same and the springs and for spring action, or the cross-ties have been passed around the back of or through the body from side to side thereof, with obvious objections, whereas my invention, by providing a body with a reinforced sill, dispenses with all forms of cross-ties and gives the body sufficient rigidity and strength to stand the stresses and strains of being directly mounted upon and supporting the road wheels, so that the body may be lowered and the passengers permitted to occupy the space formerly occupied by cross-ties or cross springs.

My invention consists mainly in adapting an automobile body and its drive wheel to unite in function as they have never united before to produce the following and other new results,—easy riding, lowered center of gravity, compactness, simplification of structure, and elimination of stresses.

The novel means of cooling where it is most needed by a rotary form of blower geared to the motor to drive with it is a great improvement over other methods in confining the cooling to certain needed areas, in regulating the amount of cooling in accordance with the revolutions of the motor and in keeping the exhaust side of the motor cooler than the intake side. The top, offset seat and door arrangement are novel in the combination shown and produce the new result of economizing wheel base, while providing a more compact and comfortable coupe type of body than any heretofore devised, and this effect is aided by my use of parts of the space above the mud guards for elbow room. The use of the vehicle side walls as supports for the wheel guide brackets economizes material and lowers the body, while allowing the brackets to be braced by the side walls reinforced for that purpose by an enlarged sill and by the body floor, seats and rear body wall. In those cases heretofore where both the front and rear wheels have been attached to an integral body structure either cushioning has not been attained at all or if partially attained the yielding means has intervened between the guiding bracket and the body structure, thus preventing the bracket from being reinforced by the body strength. My invention also substitutes for the ordinary suspension and shock-absorbing springs rubber shock-absorbers in a form so compact that it permits the body to be lowered so that it occupies the space heretofore occupied by axles and springs in conventional autos, and by cross-ties, in efforts to spring the rear drive and retain the drive wheels in their plane of rotation, whereas in my invention the body itself (that is the load carrier or container for passengers or goods) reinforced for the purpose functions through the shock-absorber brackets, not only to furnish vertical guides for the wheels, but to hold each wheel in its plane of rotation; which has heretofore been accomplished only through the resistance of leaf springs to twisting motion.

Furthermore, my invention provides a novel arrangement of parts and mounting of the body upon wheels in such manner that each wheel is independently cushioned by its own shock-absorber, while the shock-absorbers of the several wheels elastically support the body and load as sprung weight and in fact, all parts, except the wheels themselves and their immediate parts are sprung; even the steering tie-rod moving vertically with the body rather than with the steering road wheels.

Through this means of eliminating axles, springs and cross-ties I have made practical and economical the easy riding vehicle of independently sprung wheels which other designers have vainly sought for the past twenty-five years.

Having thus disclosed my invention it will be evident that the invention resides in the new results produced by the novel combinations shown and that wide latitude can be had in adapting the parts without departing from the spirit of my invention.

What I claim is:—

1. An auto vehicle having a drive wheel and a body having each of its side walls inset to form a drive wheel housing, a floor and a seat in said body reinforcing said walls adjacent said housings, a vertical guide bracket attached to a portion of said housing and braced thereby, a drive wheel mounted upon the said guide bracket for yieldable vertical movement relative to the said housing, while being retained in its plane of rotation by the said bracket, and a drive shaft leading from a universal joint attachment on the said wheel to another universal joint moving with the said housing.

2. An automobile having a body, a bracket attached to the side wall of the lower rear portion of the body, the latter having a floor bracing said bracket through said wall, a reduction gear drive carried by parts rigid with the said lower wall portion, a universal joint adjacent one side of the said gear, a co-extensive slot in the said bracket and wall, a hollow stub axle part guided upon the said bracket for vertical movement, a wheel mounted upon bearings on said stub axle part and attached to a universal joint located outwardly of the said bearings, and a drive shaft connecting the said universal joints and passing freely through the said bracket slot and the said stub axle part.

3. A vehicle having a body, a drive wheel, a mount for the wheel comprising two non-rotatable associated parts located adjacent the wheel center and guided for relative vertical movement upon each other, one of the said parts carrying the wheel and the other part having a slot and being attached to the side wall of the said vehicle along the side and above the bottom thereof, the wall being provided with a corresponding slot, and driving means for the said wheel passing through the said slots, the alinement of the said wheel relative to the said vehicle maintained by the said guided parts.

4. In combination with an automobile drive wheel for a vehicle, non-rotating wheel and body connections guided for vertical movement relative to each other, elastic bands attached to the said connections and resisting the said movement, a drive shaft passing from the said vehicle between the said bands to a universal joint in the said wheel, and cushions attached to the said connections above and below the said shaft to limit its vertical movement.

5. An automobile wheel support comprising a slotted bracket attached to the side of the said automobile and embodying relatively movable bracket members, the said bracket being braced by immediate contact of one of its members with the said side, and the said bracket members having arms, rubber bands engaging said arms at opposite sides of the bracket and resisting the said movement of the bracket members, a wheel drive shaft leading from within the said automobile through the said bracket and between the said bands to a universal joint on the said wheel, and the said wheel held in its plane of rotation by the said bracket.

6. In combination with the drive wheels of an automobile, a body having side walls, a rear wall, a floor and a sill at the base of the body, all mutually connected to and rigidly bracing each other, each side wall being provided with an inset wheel housing braced by the said body parts through said wall, a road wheel bracket rigid with said housings, means yieldingly supporting the wheels from said brackets for guided vertical movement, a universal joint having a support rigid with the said sill intermediate the said wheels, the said wheel housings having apertures adjacent the wheels, and a shaft connected to the said universal joint and leading therefrom through the said aperture to drive the said wheel, the said bracket reinforcing the said housing adjacent the said aperture.

7. A vehicle having a body, a drive wheel, a support for the wheel comprising two non-rotatable brackets guided upon each other for relative vertical motion, the first of said brackets having a hollow stub axle carrying said wheel, the second of the said brackets being attached to the side wall of the said vehicle and cooperating with the said wall to hold the said wheel in its plane of rotation upon the said bearings, the said bracket and wall having co-extensive openings therein, means to yieldingly resist the said vertical motion, and a flexible drive passing through said opening from within the said vehicle and through the said stub axle to drive the said wheel.

8. In combination with the body and drive wheel of an automobile, said body having a side wall extending parallel to the plane of rotation of the wheel below the said wheel center and having a slot therein, a wheel guiding bracket attached to the said side wall and having a slot substantially coextensive with said slot in the said wall, arms on the said bracket extending laterally at each side of said slot and parallel to the plane of the said wheel, a wheel supporting bracket carrying a stub axle member for the wheel and having corresponding arms, said supporting bracket being in guided engagement with the guide bracket to permit relative vertical motion between the body and wheel, rubber bands connecting and resisting the separation of the corresponding sets of arms and individually suspending said wheel from the body, and a drive shaft extending outwardly through said slots to the wheel.

9. In combination with a vehicle body, and a vehicle drive wheel having a brake drum attached thereto, a shaft drive for the said wheel from a universal joint located adjacent the vehicle rear center to another universal joint attached to the said wheel, shock-absorber parts positioned intermediate the said joints so that they have relative vertical motion, and means including a radius rod and a brake band to cause a braking effect upon the said drum without cramping said shock-absorber parts.

10. In combination with an automobile body and a wheel having a brake drum attached thereto, yieldable guide means connecting the said body and wheel to permit relative vertical motion therebetween, a braking means for the said drum, and a radius rod extending from a journaled attachment on the said body to said braking means to absorb the torque thereof.

11. In a vehicle of the class described, a vehicle body having a side wall and a floor bracing said side wall, a bracket attachment and vertical guide for the vehicle drive wheel intervening between said wheel and the vehicle side wall, where the said wall is braced by the vehicle floor, means yieldingly opposing the vertical guide movement and individually suspending the wheel from the body, and means to drive the said wheel, said means being coupled to a universal joint located externally of the said wall.

12. In an automobile, a body having a reinforced lower portion, wheels at opposite sides thereof, a vertically slotted bracket at each side of the body, said bracket carrying a wheel supporting stub axle and in guided connection with the body to permit relative vertical motion between the body and wheel, resilient means associated with each bracket and independently yieldingly suspending each stub axle from the body, and a driving shaft passing through the said slot to rotate the said wheel, one end of the said shaft terminating in a universal joint connection to the said wheel.

13. In a vehicle wheel support, a vehicle body, a slotted bracket, a wheel supported by the bracket to permit relative vertical motion between the wheel body and bracket, shock-absorber bands arranged upon said slotted bracket at opposite sides of the vertical plane of the wheel axis, the said bracket rigidly attached to the vehicle body, means rigidly reinforcing the body and bracket so as to maintain the said wheel in its plane of rotation relative to the vehicle body, a shaft to rotate the said wheel guided for vertical movement in the said slot and between the said bands, and a universal joint connection between the said wheel and shaft on the hub-cap side of the wheel bearings.

14. In an automobile, a body having side walls, a rear wall, and a floor connecting and rigidly bracing said walls, a reinforcing sill arranged between and along the walls and reinforcing the same, rear drive wheels, a rear end drive including a reduction gear and a universal joint mounted upon the reinforced lower portion of the automobile body between the rear wheels, the body side walls and back cooperating with the body floor to hold a wheel supporting bracket secured to the body side wall between the said gear and a drive wheel and extending with said side wall from the bottom thereof above and below the said floor, the said bracket having an aperture and vertical guides arranged at opposite sides thereof to maintain the said wheel in its plane of rotation and permit relative vertical motion between the wheel and the body, resilient means on opposite sides of said aperture receiving such vertical motion and individually suspending the wheel from the body, and a drive shaft from the said gear passing freely through the said aperture to a universal joint on the said wheel.

15. An automobile comprising a body, seats, a floor and a reinforcing sill, the lower portion of said body including its sides and back being braced internally by said floor, seats and sill so as to provide a reinforcing frame structure for the body acting as a substitute for a chassis frame, rear road wheels, driving parts secured to the said lower reinforced portion of the body between the rear road wheels, the said parts extending above and below the plane of the said floor, said seats embodying or including a passenger seat located above the said driving parts, and brackets yieldably attached to the sides of the body to permit relative vertical movement between the body and the said wheels and to unyieldingly maintain each wheel in a fixed plane of rotation relative to the body, the said brackets being located between the wheel centers and the bottom portions of the said side walls and extending along said walls above and below the plane of the floor.

16. An auto vehicle having drive wheels provided with stub axles, a body having side walls extending downward below the drive wheel centers, a bracket attached to one of the said side walls, substantially co-extensive apertures, said side wall and bracket having yieldable vertical means connecting the said bracket to the stub axle of a drive wheel, a brake on the said wheel, a drive shaft from within the said body extending outward through the said aperture to drive the said wheel, and brake operating means mounted in part on said side wall and operative to cause said wall to take the brake torque whereby to maintain the wheel alinement through the said bracket.

17. In combination with a vehicle body and a drive wheel, supporting and driving means for each wheel comprising two shock-absorber parts guided upon each other for vertical movement, both of said parts confined substantially within the wheel tire limits and one of said parts being fixed to and extending from the extreme bottom of the said vehicle upward along the outside wall thereof, yieldable rubber means supported by the said parts outside the said wall to resist the said movement and independently suspend said wheel independent of the other wheel, and a flexible drive from within the said vehicle to drive the said wheel.

18. The combination in an automobile having a body and a wheel, of a drive means rigidly secured to the said body, a stub-axle wheel carrying bracket in guided connection with the body so as to permit relative vertical motion between the body and wheel and to maintain the wheel in a fixed plane of rotation relative to the said body, yielding means resisting such relative vertical motion and directly suspending the wheel from the body, and a universal joint and shaft drive connection between the said means and the said wheel.

19. The combination, in an automobile, of a body having side walls and a sill reinforcing and rigidly sustaining the said side walls, a wheel, yielding supporting means for the wheel held in guiding alinement with said walls by the sustaining action of the said reinforcing sill, and a flexible drive shaft extending outward from the said body above the said sill to drive the said wheel.

20. In an automobile, a body having side walls and a floor, a truss-girder reinforcing and stiffening said walls against relative bending or twisting movements under running pressures and strains, drive wheels, a supporting and guiding connection for each wheel mounting the same independently of the other wheel upon the adjacent side wall so as to permit relative vertical movement between the body and wheel, said supporting and guiding connections being rigidly maintained by the girder stiffening action upon the wheels to hold the wheels from deviation from fixed planes of rotation relative to said walls, a differential wheel drive carried by the girder, resilient means resisting such vertical motion between each wheel and the body and independently suspending said wheel independent of the other wheel from the body, and a driving connection between the differential and each wheel.

21. In an automobile, the combination of a wheel and a body having an inset side wall forming a wheel housing, truss-girder bracing the lower part of the said wall adjacent the said wheel, and a bracket secured to the said wall, the said bracket including two members having parallel guides located within the tire limits of the said wheel to hold the said wheel in its plane of rotation while permitting it to yieldably move vertically, resilient means resisting such motion and independently suspending the wheel from the body, and a reduction gear drive means for the said wheel rigid with the said body bottom.

22. The combination, in an automobile, of a body, a drive wheel, the body having a side wall extending downwardly adjacent the center of said wheel, a slotted bracket rigid with said side of the body, a wheel support in guided connection with said bracket to permit only relative vertical motion between the body and the wheel, a drive connection extending outwardly through the slotted bracket to the wheel, and means connecting the bracket and wheel support for resisting relative vertical movement between the wheel and body and suspending the wheel from the body independent of said driving connection, the said downwardly extending side wall having a reinforcing sill to assist said side wall in preventing other than the said vertical motion.

23. In an automobile, a body, drive and steering wheels, brackets rigid with said body, means yieldably connecting said drive and steering wheels with said brackets to independently suspend said wheels from and allow only relative vertical motion between the wheels and body, a differential drive gearing mounted on a support rigid with the body, and connections from said differential driving means to drive the said drive wheels, said connections being movable vertically relative to the said guide brackets.

24. The combination, in an automobile, of a body, a drive wheel, the body having a side wall extending downwardly adjacent the center of said wheel, supporting and guiding means resiliently suspending the drive wheel from the body and guidingly connecting the said drive wheel and side wall for permitting only relative vertical motion between the wheel and body, and a drive shaft connection to the wheel movable with the body and wheel in their up and down motions and guided in such up and down motions by said wheel supporting and guiding means, the said downwardly extending side wall having a sill reinforcing said side wall to assist the same in preventing other than said vertical motion.

25. In combination, in an automobile, of a body, a driving wheel, the body having a side wall extending downwardly adjacent the wheel center, a slotted guide bracket rigid with said body, a wheel supporting stub axle in guided connection with the bracket to permit only relative vertical motion between the body and wheel, a drive shaft extending through the bracket to the wheel and articulated to move upwardly and downwardly with the body and wheel, a reinforcing sill strengthening the body and said side wall to assist the latter in preventing other than said vertical motion between the wheel and body, and resilient means between the wheel support and bracket suspending the wheel from the body independent of any other connection therewith.

26. The combination in an automobile having a body and a drive wheel, said body being provided with a side wall extending downwardly adjacent to the wheel center, of a reinforcing sill strengthening and stiffening the body and the said side wall thereof, a stub axle wheel carrying bracket in guided connection with the said side wall of the body at opposite sides of the axle so as to permit relative vertical motion only between the body and wheel, drive means rigidly mounted on the reinforcing sill, a drive shaft universally jointed to the driving means and the wheel to move upwardly and downwardly with the body and wheel, and yielding means connecting the stub-axle bracket with the body at opposite sides of the bracket so as to resist such relative vertical motion between the wheel and body, said yielding means completely suspending the wheel elastically from the body, the said side wall of the body being so structurally reinforced by the sill as to coact with said guiding means to maintain alinement of the guiding connections and to hold the wheel in a fixed rotational plane.

27. In an automobile having a body with a reinforced lower portion, guide brackets rigid with the said lower portion, drive and steering wheels yieldably attached for vertical movement to said guide brackets, means rigid with the body to produce a differential action of the said drive wheels, and means from the said means to drive the said drive wheels while they move vertically relative to the said guide brackets.

28. An automobile of the character set forth in claim 27 in which the steering road wheels are steeringly connected by a steering tie rod moving vertically with the said body relative the said yieldable movement.

29. The combination in an automobile having a body and steering road wheels, cushioning means between the said body and the said wheels permitting relative vertical movement therebetween, a steering tie rod steeringly connecting the said wheels and moving with the said body in respect to the said vertical movement and means, other than the said tie rod, holding the said wheels in rotational spaced apart relationship to each other, the last said means also moving with the body in respect to the said vertical movement.

30. A combination according to claim 27 wherein the drive wheel is guidingly connected with a body bracket by a stub-axle part of the wheel and which body bracket is suspended by rubber in tension from said stub-axle part.

31. A combination according to claim 27 including means to apply to brake to the drive wheel and means to absorb the brake torque in the said body without twisting the said guide bracket.

32. An automobile body provided at its lower extremity with guide wheel brackets guidingly attached to the body so as to permit only relative motion between each bracket and body, drive wheels rotatably mounted upon the said brackets, a driving differential rigidly mounted upon the said body, flexible driving means to drive the said wheels from the differential, and yielding means independently suspending the body from each wheel independent of any other wheel.

33. An automobile having a body with a reinforced portion and rear wheels with a drive that is housed by and rigid with said portion, a vertically yieldable member interposed between each wheel and the body side and means rigidly connecting said member and the body side that unyieldably hold the said wheels in their rotational plane and a shaft and universal connection between the said drive and each said wheel.

In testimony whereof I affix my signature.

JAMES V. MARTIN.